(12) United States Patent
Joo

(10) Patent No.: US 10,707,520 B2
(45) Date of Patent: *Jul. 7, 2020

(54) METHOD OF MAKING LITHIUM SECONDARY BATTERY

(71) Applicant: Seung-ki Joo, Seongnam (KR)

(72) Inventor: Seung-ki Joo, Seongnam (KR)

(73) Assignee: Seung-Ki Joo, Seongnam (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,922

(22) Filed: Sep. 5, 2018

(65) Prior Publication Data

US 2019/0097264 A1   Mar. 28, 2019

(30) Foreign Application Priority Data

Jul. 26, 2017   (KR) .......................... 10-2017-0094825

(51) Int. Cl.
*H01M 10/00*   (2006.01)
*H01M 10/0525*   (2010.01)
(Continued)

(52) U.S. Cl.
CPC ....... *H01M 10/0525* (2013.01); *H01M 4/043* (2013.01); *H01M 4/0416* (2013.01); *H01M 4/0471* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1393* (2013.01); *H01M 4/1395* (2013.01); *H01M 4/1397* (2013.01);
(Continued)

(58) Field of Classification Search
CPC ................................................. H01M 10/0525
See application file for complete search history.

(56) References Cited

U.S. PATENT DOCUMENTS 10,096,861 B2 * 10/2018 Joo ................... H01M 10/0585
2015/0280216 A1 * 10/2015 Sumiyama ............ H01M 2/162
429/156

(Continued)

FOREIGN PATENT DOCUMENTS

KR   20130101375   9/2013
KR   20160007557   1/2016
(Continued)

OTHER PUBLICATIONS

Full English machine translation of KR 20130101375 A (Year: 2013).*

*Primary Examiner* — Milton I Cano
*Assistant Examiner* — Mary G Henshaw
(74) *Attorney, Agent, or Firm* — Cantor Colburn LLP

(57) ABSTRACT

Provided is a method of manufacturing a lithium secondary battery, the method including: preparing positive and negative metal foams having a plurality of first pores; controlling first pore sizes of the metal foams depending on an application; filling the first pores with a slurry obtained by mixing a positive electrode active material or a negative electrode active material, a binder, a conductive material, and an organic solvent; heat-treating the metal foams to form second pores having a size smaller than those of the first pores. The first pore size of the metal foam can be controlled, so that a high capacity and high output battery can be manufactured depending on the usage.

8 Claims, 7 Drawing Sheets

(51) Int. Cl.
*H01M 4/46* (2006.01)
*H01M 4/40* (2006.01)
*H01M 4/32* (2006.01)
*H01M 10/04* (2006.01)
*H01M 4/04* (2006.01)
*H01M 4/133* (2010.01)
*H01M 4/1393* (2010.01)
*H01M 4/136* (2010.01)
*H01M 4/80* (2006.01)
*H01M 4/505* (2010.01)
*H01M 4/1395* (2010.01)
*H01M 4/1397* (2010.01)
*H01M 4/1391* (2010.01)
*H01M 4/58* (2010.01)
*H01M 4/131* (2010.01)
*H01M 4/134* (2010.01)
*H01M 4/485* (2010.01)
*H01M 4/66* (2006.01)
*H01M 4/62* (2006.01)
*H01M 4/02* (2006.01)

(52) U.S. Cl.
CPC ............. *H01M 4/32* (2013.01); *H01M 4/405* (2013.01); *H01M 4/463* (2013.01); *H01M 4/485* (2013.01); *H01M 4/505* (2013.01); *H01M 4/5825* (2013.01); *H01M 4/661* (2013.01); *H01M 4/808* (2013.01); *H01M 10/0459* (2013.01); *H01M 4/621* (2013.01); *H01M 2004/021* (2013.01)

(56) References Cited

U.S. PATENT DOCUMENTS

2016/0079006 A1* 3/2016 Hosoe .................... H01G 11/36
  429/211
2016/0240828 A1* 8/2016 Ueda ...................... H01G 11/68

FOREIGN PATENT DOCUMENTS

KR  20160057388  5/2016
KR  20160123050  10/2016

* cited by examiner

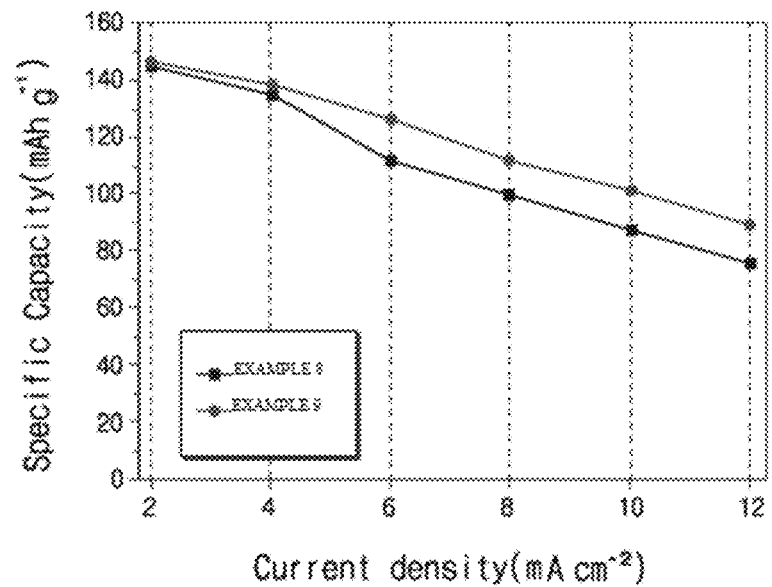
FIG. 9
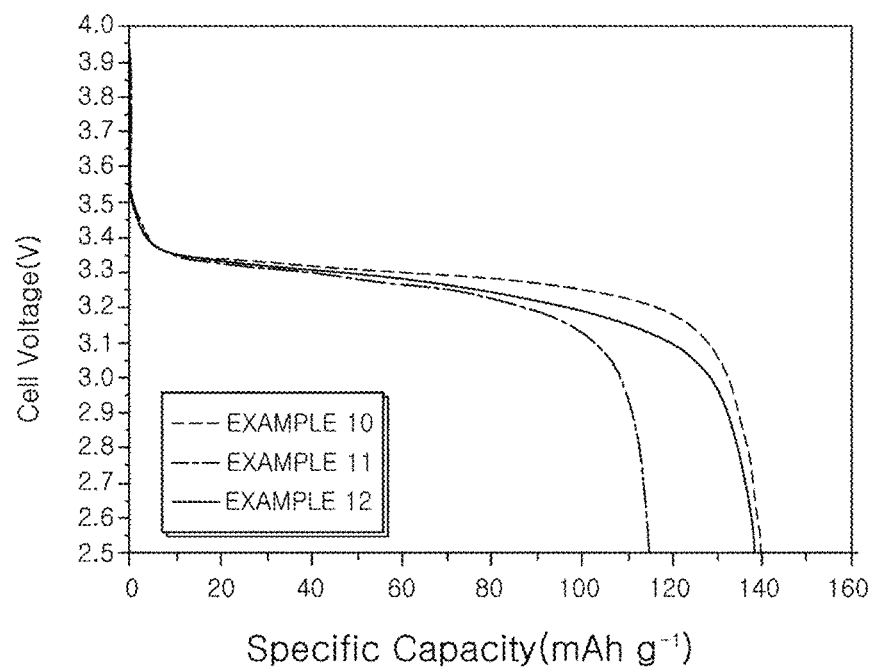

METHOD OF MAKING LITHIUM SECONDARY BATTERY

FIELD OF THE INVENTION

The present disclosure relates to a method of manufacturing a lithium secondary battery in which a positive electrode or a negative electrode current collector is manufactured by filling a metal foam having pores with a slurry in which a positive or negative electrode active material, a binder, and an organic solvent are mixed.

DESCRIPTION OF THE RELATED ART

In recent years, demand for secondary batteries as an energy source has been rapidly increasing due to an increase in the development and demand of portable devices, electric vehicles, toy model helicopters, drones, and the like.

The positive and negative electrodes of the lithium secondary battery are coated with a small amount of a positive electrode active material in a slurry state on an aluminum (Al) foil, followed by heat-treatment and pressing to produce a thin film.

Thick coating of the active material restricts the movement of electrons and lithium ions, and causes the active material to separate from the foil. In order to solve such a problem, studies on a lithium secondary battery using a metal foam having a three-dimensional pore structure instead of a foil as a conventional current collector have been actively conducted.

As disclosed in Korean Patent Application Publication No. 10-2016-0123050 (published on Oct. 25, 2016), a method for manufacturing such a lithium secondary battery includes: preparing a metal foam having a plurality of first pores; filling a plurality of first pores of the metal foam with a slurry prepared by mixing a positive electrode active material, a binder, a conductive material, and an organic solvent; and heat-treating the metal foam filled with the slurry at a temperature of 150° C. to 200° C. for 6 to 12 hours to remove the organic solvent; fixing the positive electrode active material, the binder, and the conductive material to inner sidewalls of the first pores to simultaneously remove the organic solvent; and implementing a metal foam positive electrode forming second pores smaller than the first pores in the plurality of first pores.

In the metal secondary battery manufacturing method, when the first pore size of the metal foam is 1500 μm or less, there is a problem that the amount of the positive electrode active material filled in the metal foam is so small that there is a limit to the production of a high capacity battery.

Further, the second pore size is controlled by adjusting a blending ratio of the organic solvent. In this case, the amount of the organic solvent is limited due to the necessity of securing the minimum viscosity required for filling the slurry of the positive electrode material. In the case that the amount of the organic solvent is increased, in order to increase the size of the second pore, the continuity of the active material is deteriorated and the electrochemical reaction is not good, and it is difficult to control the viscosity of the slurry according to the application.

SUMMARY OF THE INVENTION

Accordingly, an object of the present disclosure is to provide a method of manufacturing a lithium secondary battery capable of selectively making a high-capacity or high-output battery because a first pore size of a metal foam can be made large or small by tension or compression.

Another object of the present disclosure is to provide a method of manufacturing a lithium secondary battery in which second pore sizes can easily be controlled depending on the use of the battery and the thickness of the electrode can be controlled by controlling the second pore sizes through a mechanical press process.

Still another object of the present disclosure is to provide a method of manufacturing lithium secondary batteries, which can simultaneously realize a high capacity and a high output by combining and manufacturing metal foams having different first pore sizes, and can realize the batteries having excellent electrochemical reaction.

According to an aspect of the present disclosure, there is provided a method of manufacturing a lithium secondary battery, the method comprising: preparing positive and negative metal foams having a plurality of first pores; controlling first pore sizes of the metal foams depending on an application; filling the first pores with a slurry obtained by mixing a positive electrode active material or a negative electrode active material, a binder, a conductive material, and an organic solvent; heat-treating the metal foams filled with the slurry to then remove the organic solvent, fix the positive electrode active material or the negative electrode active material, the binder, and the conductive material to inner sidewalls of the first pores, and form second pores having a size smaller than those of the first pores; and sequentially laminating a separator and a negative electrode on both surfaces or one surface of a positive electrode of the metal foams into which an electrolyte is permeated.

The material of the positive electrode metal foam includes one of Al, NiCrAl, NiFeCrAl, Ni—Cr, and NiAl.

The material of the negative electrode metal foam includes Ni, Cu, Ni coated with Cu, a Ni and Cu alloy, and a Ni and Al alloy.

The controlling the first pore sizes of the metal foams includes compressing the first pore sizes by using a mechanical press to make the first pore sizes smaller and tensioning the metal foams by using a tension device to make the first pore sizes larger.

The first pore sizes of the metal foams may be formed to be 450 μm or less, or 3000 μm or more.

The first pores of the metal foams are formed in an elliptical shape in the thickness direction of the metal foams by tension or compression.

The slurry to be filled in the positive electrode metal foam is prepared by mixing a positive electrode active material of $LiFePO_4$, $LiCoO_2$ or $LiMn_2O_4$, a binder, and a conductive material with an organic solvent.

The slurry to be filled in the negative electrode metal foam is prepared by mixing a carbon-based, silicon-based, metal-based or oxide-based negative electrode active material, a binder, and a conductive material with an organic solvent.

The method further includes controlling second pore sizes of the metal foams after the heat-treatment of the slurry-filled metal foams. The controlling the second pore sizes of the metal foams includes controlling the second pore sizes according to the degree of pressing the metal foams.

The heat-treatment of the slurry-filled metal foams includes a first heat-treatment of the slurry-filled metal foams at a temperature of 50° C. to 100° C. for 5 to 60 minutes, preparing metal foams having a predetermined thickness by pressing the metal foams, and a second heat-treatment of the metal foams having a predetermined thickness at 100° C. to 150° C. to control the second pore sizes.

The heat-treatment of the negative electrode metal foam is performed at a temperature lower than a set temperature or in a vacuum state in order to prevent Ni or Cu from being oxidized.

The metal foams are manufactured by mutually laminating a plurality of metal foams having different first pore sizes.

The metal foams include a first metal foam having a first pore size of 450 μm or less and a second metal foam having a first pore size of 3000 μm or more.

BRIEF DESCRIPTION OF DRAWINGS

FIGS. 5 to 9 are measurement graphs according to test examples of the present disclosure.

DETAILED DESCRIPTION OF THE INVENTION

Figure 1:
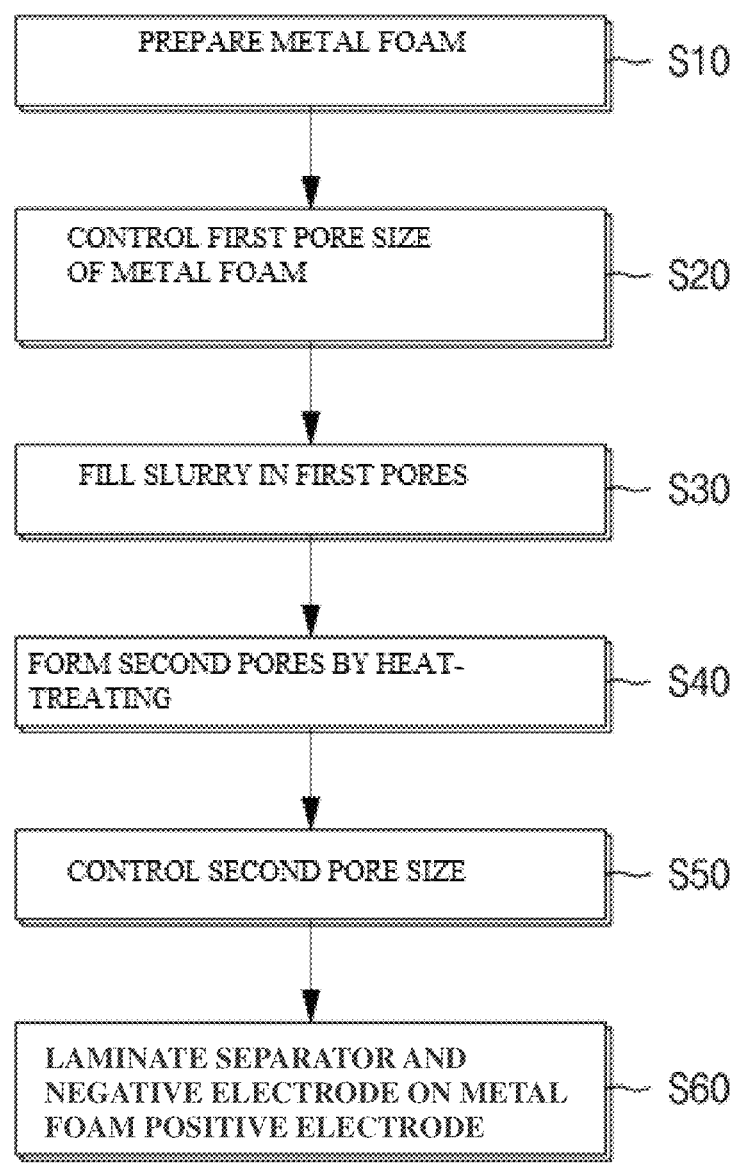
FIG. 1 is a process flowchart illustrating a method of manufacturing a lithium secondary battery according to an embodiment of the present disclosure.

Hereinafter, embodiments of the present disclosure will be described in detail with reference to the accompanying drawings. The sizes and shapes of the components shown in the drawings may be exaggerated for clarity and convenience. In addition, terms defined in consideration of the configuration and operation of the present disclosure may vary depending on the intention or custom of the user, the operator, and the like. Definitions of these terms should be based on the content of this specification.

FIG. 1 is a process flowchart illustrating a method of manufacturing a lithium secondary battery according to an embodiment of the present disclosure.

In the method of manufacturing a lithium secondary battery according to an embodiment of the present disclosure, a metal foam having a plurality of first pores having a three-dimensional structure is prepared (S10).

Here, the material of the metal foam of the positive electrode includes one of Al, NiCrAl, NiFeCrAl, Ni—Cr, and NiAl, and the material of the metal foam of the negative electrode is Ni, Cu, Ni coated with Cu or an alloy made of a combination of Ni and Cu, and a Ni and Al alloy.

The metal foams can be prepared by various methods. For example, NiCrAl alloy metal foams can be prepared by coating Ni on a polyurethane foam by sputtering, applying Ni, Cr, and Al powder to the Ni-coated polyurethane foam, and then heat-treating the resultant. That is, by performing the sputtering process and the heat-treatment process, a NiCrAl alloy metal foam having a NiCrAl alloy coated on a polyurethane foam and sidewalls of pores inside the polyurethane foam is manufactured.

Then, the first pore size is controlled according to an intended use of the prepared metal foam (S20). The output and capacity of the battery are determined according to the first pore size of the metal foam. That is, when the first pore size of the metal foam is small, the amount of the metal foam inside the electrode is increased and the surface area of the reaction is widened, thereby realizing a high output battery.

On the contrary, when the first pore size of the metal foam is increased, the amount of the active material is increased, thereby realizing a high capacity battery.

The first pore size of the metal foam is controlled according to the use of the battery. The first pore size can be reduced by compressing the metal foam in the thickness direction by using a press device or the like, and the first pore size can be made larger by tensioning the metal foam by using a tension device.

The pore size of the metal foam is formed to be 450 μm or less by compression using a press device to realize a high output battery and is formed to be 3000 μm or more with a tension by using a tension device to realize a high capacity battery.

When the metal foam is tensioned or compressed, the first pore shape is formed in an elliptical shape in the thickness direction instead of a spherical shape, so that the reaction area is greatly widened, and thus more excellent electrochemical characteristics can be obtained.

As described above, in this embodiment, the first pore size of the metal foam can be controlled according to the use of the battery, to thereby produce batteries of various uses.

A slurry of a mixture containing a positive or negative electrode active material, a binder, a conductive material, and an organic solvent is filled into the first pores of the metal foam (S30).

Here, the viscosity of the slurry can be substantially determined according to the content of the organic solvent, and the higher the organic solvent content, the lower the viscosity.

That is, when the viscosity of the organic solvent is high, it is difficult to fill the first pores with the slurry, and the charging rate of the active material is lowered, thereby reducing the charge/discharge capacity. In addition, when the viscosity of the organic solvent is low, the contact between the metal foam and the active material or between the active materials is low and the electrochemical reaction is degraded.

In some embodiments of the present disclosure, since the second pore size is not controlled by the amount of the organic solvent, the optimum amount of the organic solvent can be used, so that a slurry having an optimum viscosity can be produced.

The slurry to be filled in the metal foam of the positive electrode may be prepared by mixing a positive electrode active material, a binder and a conductive material in the form of powder with an organic solvent.

That is, the positive electrode active material powder such as $LiFePO_4$, $LiCoO_2$, and $LiMn_2O_4$, the binder powder containing polyvinylidene fluoride (PVdF), and the carbon-based powder used as the conductive material are mixed with the organic solvent such as N-methyl-2-pyrrolidone (NMP).

In addition, the slurry to be filled in the metal foam of the negative electrode may be prepared by mixing a negative electrode active material, a binder and a conductive material in the form of powder with an organic solvent.

That is, a negative electrode active material powder including a carbon-based, silicon-based, metal-based, and oxide-based negative electrode active material, a binder powder including polyvinylidene fluoride (PVdF), and a carbon-based powder used as a conductive material are mixed with an organic solvent such as N-methyl-2-pyrrolidone (NMP).

The method of filling the slurry into the metal foam is as follows: The slurry is pushed in one side of the metal foam to fill the slurry in a degree that the slurry is pushed out of the other side thereof, and then the slurry is pushed in the same manner into the other side. The above slurry filling process is repeated until the slurry is well filled in the metal foam.

The metal foam filled with the slurry is heat-treated to form second pores (S40).

The metal foam heat-treatment process includes heat-treating the metal foam filled with the slurry at a temperature of 50° C. to 100° C. for 6 to 12 hours to remove the organic solvent; fixing a positive or negative electrode active material, a binder, and a conductive material to inner sidewalls of the first pores to simultaneously remove the organic solvent; and implementing a metal foam positive or negative electrode forming second pores smaller than the first pores in the plurality of first pores.

The heat-treatment of the negative electrode metal foam is characterized in that the heat-treatment is performed at a temperature lower than a set temperature or in a vacuum state in order to prevent Ni or Cu from being oxidized.

When the heat-treatment is completed, the second pore size of the metal foam is controlled by a mechanical press (S50).

According to another metal foam heat-treatment process, the metal foam is subjected to a first heat-treatment at a temperature of 50° C. to 100° C. for 5 to 60 minutes, to thereby form the metal foam to a predetermined thickness by a mechanical press, and is subjected to a second heat-treatment at a temperature of 100° C. to 150° C., to thereby control the second pore size.

As described above, in some embodiments of the present disclosure, it is easy and convenient to control the second pore size by controlling the thickness of the metal foam by the mechanical press after the heat-treatment of the metal foam and controlling the second pore size according to the use purpose of the battery.

Then, an electrolytic solution is applied to the surface of the metal foam positive electrode to penetrate the electrolyte into the second pores, and the separator and the negative electrode are sequentially deposited on both sides or one side of the metal foam positive electrode (S60). In this way, the metal foam positive electrode and the metal foam negative electrode are separated from each other using the separator interposed between the metal foam positive electrode and the metal foam negative electrode.

Figure 2:
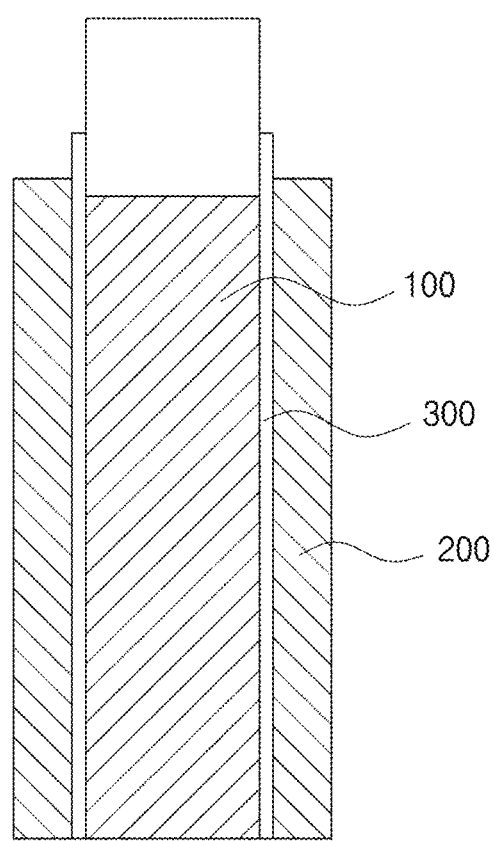
FIG. 2 is a cross-sectional view of a lithium secondary battery according to an embodiment of the present disclosure.

FIG. 2 is a cross-sectional view of a lithium secondary battery according to an embodiment of the present disclosure, and shows that a separator 300 and a negative electrode 200 are sequentially stacked on both surfaces of a metal foam positive electrode 100.

Figure 3:
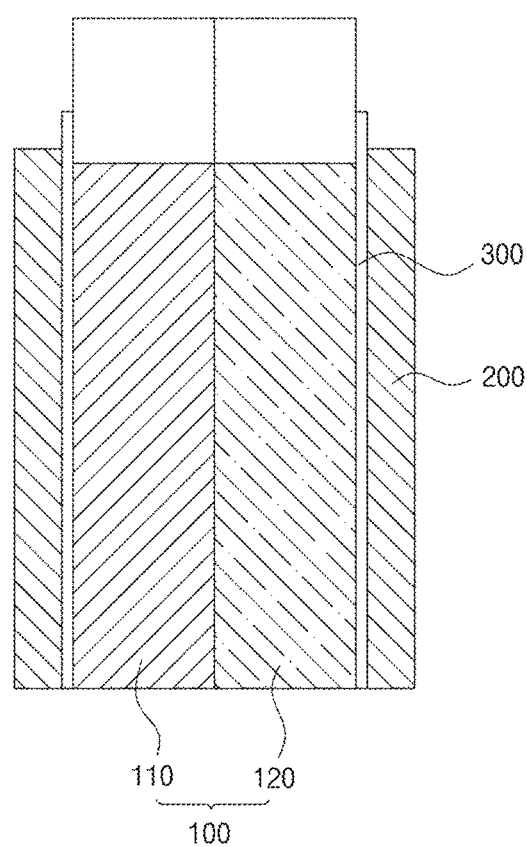
FIG. 3 is a cross-sectional view of a lithium secondary battery according to another embodiment of the present disclosure.

FIG. 3 is a cross-sectional view of a lithium secondary battery according to another embodiment of the present disclosure.

The lithium secondary battery according to another embodiment includes a positive electrode 100 composed of a first metal foam 110 and a second metal foam 120 stacked one on top of the other and having different first pore sizes, and a separator 300 and a negative electrode 200 sequentially stacked on both surfaces or one surface of the positive electrode 100.

The first metal foam 110 has first pore sizes of 450 μm or less to realize a high output battery. In addition, the second metal foam 120 has first pore sizes of 3000 μm or more to realize a high capacity battery.

As described above, the lithium secondary battery according to another embodiment of the present disclosure includes the first metal foam 110 capable of realizing a high output and the second metal foam 120 capable of realizing a high capacity, in which the first metal foam 110 is stacked on the second metal foam 120, to thereby realize a high capacity battery as well as a high output battery.

Figure 4:
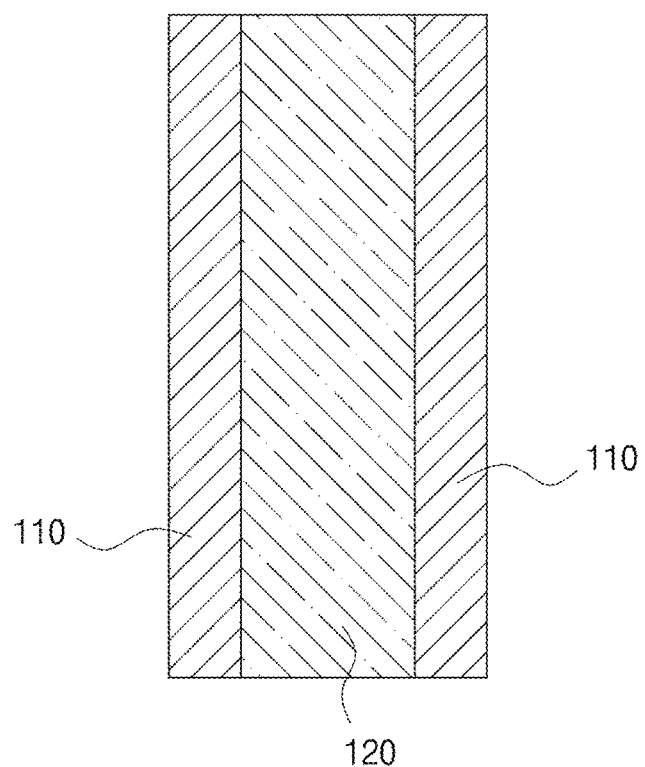
FIG. 4 is a cross-sectional view of a metal foam of a lithium secondary battery according to another embodiment of the present disclosure.

The first metal foam 110 and the second metal foam 120 may have different thicknesses depending on the application. As shown in FIG. 4, the first metal foam 110 may be formed on both sides of the second metal foam 120. On the contrary, the second metal foam 120 may be stacked on both sides of the first metal foam 110.

Hereinafter, the results of the experimental examples will be described in detail based on Examples and Comparative Examples of the present disclosure.

Example 1

A positive electrode active material of 0.75 g (75 wt. %) containing $LiFePO_4$, a conductive material of 0.15 g (15 wt. %) containing a carbon black, and a binder of 0.1 g (10 wt. %) containing polyvinylidene fluoride (PVdF) were mixed in an organic solvent of 1 ml containing N-methyl-2-pyrrolidone (NMP), to have prepared a slurry. This slurry was filled in pores of a NiCrAl alloy metal foam having a first pore size of 1200 μm and a thickness of 3000 μm and then heat-treated at 130° C. for 8 hours. Thereafter, a metal foam positive electrode for a lithium secondary battery was produced without a pressing process.

Example 2

A metal foam positive electrode was prepared in the same manner as in Example 1 except that the first pore size of the metal foam was 3000 μm.

Example 3

A slurry was prepared in the same manner as in Example 1 above. This slurry was filled in pores of a NiCrAl alloy metal foam having a first pore size of 1200 μm and a thickness of 3000 μm and then heat-treated at 130° C. for 8 hours. Thereafter, a metal foam positive electrode for a lithium secondary battery was produced without a pressing process.

Example 4

A metal foam positive electrode was prepared in the same manner as in Example 3, except that the electrode was heat-treated at 130° C. for 8 hours and pressed to have a thickness of 4000 μm.

Example 5

A metal foam positive electrode was prepared in the same manner as in Example 3, except that the electrode was heat-treated at 130° C. for 8 hours and pressed to have a thickness of 2500 μm.

Example 6

A slurry was prepared in the same manner as in Example 1 above. The thickness of the NiCrAl alloy metal foam having a pore size of 450 μm was polished to 500 μm to maintain the shape of the first pores in a spherical shape.

Thereafter, the slurry was filled in the first pores and then heat-treated at 130° C. for 8 hours. Thereafter, a metal foam positive electrode for a lithium secondary battery was produced without a pressing process.

Example 7

The same procedure as in Example 6 was carried out to prepare a NiCrAl alloy metal foam positive electrode, except that a metal foam having a pore size of 450 µm and a thickness of 1600 µm was pressed at 500 µm to make the shape of the first pores into a disk shape and then the slurry was filled in the metal foam and the electrode was heat-treated.

Example 8

A slurry was prepared in the same manner as in Example 1 above. This slurry was filled in pores of a NiCrAl alloy metal foam having a first pore size of 1200 µm and a thickness of 1500 µm and then heat-treated at 130° C. for 8 hours. Thereafter, the NiCrAl alloy metal foam was pressed to a thickness of 1000 µm to prepare a metal foam positive electrode.

Example 9

A metal foam positive electrode was fabricated in the same manner as in Example 8 above, except that the slurry was filled in pores of a NiCrAl alloy metal foam having a pore size of 1200 µm and a thickness of 1500 µm and subjected to a first heat-treatment at 100° C. for 30 minutes and then pressed to have a thickness of 1000 µm and a secondary heat-treatment at 130° C. for 8 hours.

Example 10

A slurry was prepared in the same manner as in Example 1 above. Then, this slurry was filled in pores of a NiCrAl alloy metal foam having a pore size of 450 µm and a thickness of 1600 µm and heat-treated at 130° C. for 8 hours to prepare a metal foam positive electrode for a lithium secondary battery.

Example 11

A metal foam positive electrode was prepared in the same manner as in Example 9 except that the first pore size was 3000 µm.

Example 12

A metal foam positive electrode was fabricated in the same manner as in Example 9 above, except that a metal foam electrode having a pore size of 450 µm and a thickness of 300 µm was adhered to both sides of the metal foam positive electrode prepared by filling the slurry in the pores of the NiCrAl alloy metal foam having the first pore size of 3000 µm and the thickness of 1000 µm, the metal foam electrode was made in the same method as the metal foam positive electrode.

Comparative Example

A slurry was prepared in the same manner as in Example 1 above. Thereafter, a metal foam positive electrode was prepared in the same manner as in Example 1, except that this slurry was filled in a metal foam having a first pore size of 450 µm and a thickness of 3000 µm.

Experimental Example 1

A separator for separating the positive electrode and the negative electrode from each other and a lithium metal as a negative electrode were laminated on both sides of the positive electrode prepared in Examples 1 and 2 and Comparative Example and an electrolyte of 1M LiPF6 in EC:DEC (1:1) was injected, to fabricate a lithium secondary battery. Thereafter, discharge capacities of the produced lithium secondary battery were compared at 2.5 V to 4 V with the same current of 4 mA, 6 mA, 8 mA, 10 mA, 12 mA, 15 mA, and 20 mA.

Figure 5:
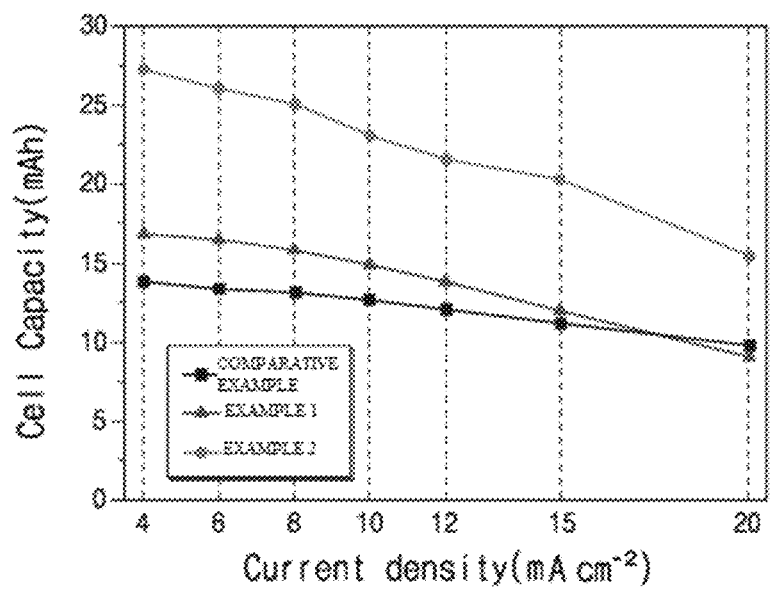

The results are shown in FIG. 5, and Example 2 having the largest first pore size appeared to have the highest capacity. This is because, unlike the prior art, when a metal foam having a size of 1500 µm or more is used, the amount of the active material is much more filled, to have a much higher capacity. Of course, the capacity decrease is higher than the comparative example at higher currents, but about 2 times higher capacity appears at lower currents, and thus the lithium secondary battery fabricated in Experimental Example 1 is most suitable as a high capacity battery.

Experimental Example 2

The batteries of Examples 3 to 5 were manufactured in the same manner as in Experimental Example 1, and the discharge capacities of the batteries were compared at the same currents of 6 mA, 8 mA, 10 mA, 12 mA, 14 mA, 16 mA, and 20 mA.

Figure 6:
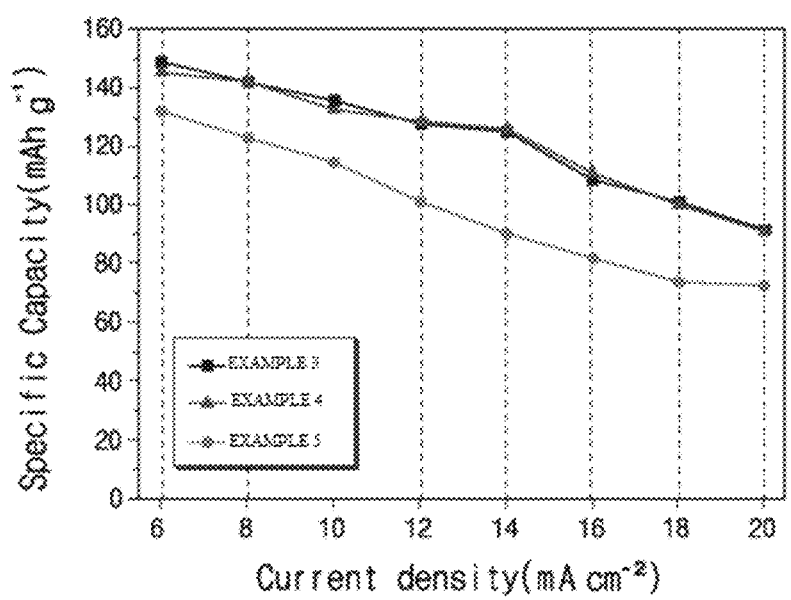

The results are shown in FIG. 6, while Examples 3 and 4 showed almost similar capacities at all currents, whereas Example 5 showed the lowest capacity. That is, the electrochemical reactions were actively generated even in the electrodes due to the fact that enough second pores were formed in Examples 3 and 4 to ease permeation of the electrolyte, while, in Example 5, the press was most strongly promoted after the heat-treatment, and it was difficult to make the electrolyte permeate due to the almost absence of second pores in the electrode, so that the reaction did not occur inside the electrode and the oxidation/reduction reaction of lithium mainly occurred only on the surface of the electrode, thus having shown the lowest capacity.

Experimental Example 3

The charge discharge capacities of Examples 6 and 7 were measured at the same current of 2 mA after the fabrication of the batteries in the same manner as in Experimental Example 1.

Figure 7:
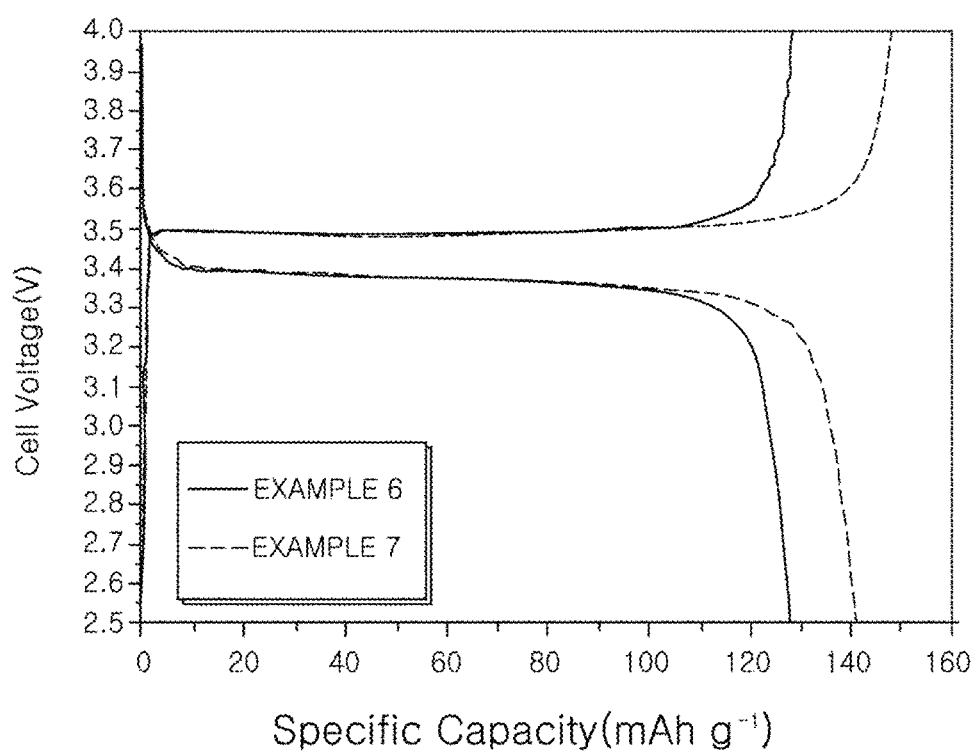

The results are shown in FIG. 7. Before the slurry was filled, the metal foams were pressed from 1600 µm to 500 µm to form the first pores in the shape of a short disk in the thickness direction instead of the sphere. Then, the slurry was filled and the electrode was heat-treated. The thus-prepared first pores of Example 7 had the same thickness as those of Example 6, but the shape of the first pores controlled by mechanical polishing of Example 7 showed a better capacity than that of Example 6 having a completely spherical shape. This is because the reaction area becomes wider and the lithium diffusion distance in the thickness direction becomes shorter, thereby exhibiting more excellent electrochemical characteristics.

Experimental Example 4

The batteries of Examples 8 and 9 were fabricated in the same manner as in Experimental Example 1, and the discharge capacities of Examples 8 and 9 were compared at the same current of 2 mA, 4 mA, 6 mA, 8 mA, 10 mA, and 12 mA.

The results are shown in FIG. 8, and the same capacity was exhibited at low currents of 2 mA and 4 mA. However, as the current increased, Example 8 showed higher capacity. This is because there are more second pores in the electrode of Example 9 than Example 8 through the second heat-treatment process after the first heat-treatment and pressing to a proper thickness, and thus the permeation of the electrolyte is much easier. That is, it is more advantageous to control the second pore size according to the intended use by performing the first heat-treatment, and then performing the second heat-treatment after pressing to an appropriate thickness.

Experimental Example 5

The batteries of Examples 10 to 12 were manufactured in the same manner as in Experimental Example 1, and then discharge curves were compared at 5 mA.

The results are shown in FIG. 9, in which Example 10 having a pore size of 450 μm showed the highest capacity, and Example 11 composed of only a pore size of 3000 μm showed the lowest capacity. As shown in FIG. 4, Example 12 produced by a sandwich structure exhibited a much higher capacity than Example 11, showing a capacity similar to that of Example 10. This is because, when a metal foam of a pore size of 450 μm is disposed on both sides of a metal foam having a pore size of 3000 μm, the oxidation/reduction reaction of lithium occurred rapidly on the electrode surface.

As described above, the method of manufacturing a lithium secondary battery according to an aspect of the present disclosure can make the first pore size of the metal foam large or small by tension or compression, thereby making it possible to selectively manufacture a high capacity or high output battery and manufacture batteries for various purposes.

Also, by controlling the size of the second pore of the metal foam through a mechanical press process, the size of the second pore can be easily controlled according to an application of the battery, and the thickness of the electrode can be controlled.

In addition, by combining and manufacturing metal foams having different first pore sizes from each other, high capacity and high output can be realized at the same time, and batteries excellent in electrochemical reaction can be realized.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

What is claimed is:

1. A method of making a lithium secondary battery, the method comprising:
   preparing positive metal foams and negative metal foams each having pores;
   compressing a positive metal foam and a negative metal foam to form a compressed positive metal foam and a compressed negative metal foam each including pores having a pore size of 450 μm or less;
   tensioning a positive metal foam and a negative metal foam to form a tensioned positive metal foam and a tensioned negative metal foam each including pores having a pore size of 3000 μm or more;
   preparing a positive slurry by mixing a positive electrode active material, a binder, a conductive material, and an organic solvent;
   preparing a negative slurry by a negative electrode active material, a binder, a conductive material, and an organic solvent;
   filling the pores of the compressed positive metal foam and the compressed negative metal foam with the positive slurry and the negative slurry, respectively, to form a slurry-filled compressed positive metal foam and a slurry-filled compressed negative metal foam;
   filling the pores of the tensioned positive metal foam and the tensioned negative metal foam with the positive slurry and the negative slurry, respectively, to form a slurry-filled tensioned positive metal foam and a slurry-filled tensioned negative metal foam;
   heat-treating the slurry-filled compressed positive metal foam, the slurry-filled compressed negative metal foam, the slurry-filled tensioned positive metal foam, and the slurry-filled tensioned negative metal foam to remove the organic solvent and form the heat-treated compressed positive metal foam, the heat-treated compressed negative metal foam, the heat-treated tensioned positive metal foam, and the heat-treated tensioned negative metal foam; and
   permeating an electrolyte into the heat-treated compressed positive metal foam and the heat-treated tensioned positive metal form resulting in a compressed positive electrode and a tensioned positive electrode;
   preparing a first separator and a second separator, and laminating the heat-treated compressed negative metal foam, the first separator, the compressed positive electrode, the tensioned positive electrode, the second separator, and the heat-treated tensioned negative metal foam to have a structure laminated in the described order.

2. The method of claim 1, wherein of the positive electrode metal foam comprises: one of Al, NiCrAl, NiFeCrAl, Ni—Cr, and NiAl.

3. The method of claim 1, wherein the negative electrode metal foam includes: one of Ni, Cu, Ni coated with Cu, a Ni and Cu alloy, and a Ni and Al alloy.

4. The method of claim 1, wherein the second pores and the third pores have an elliptical shape.

5. The method of claim 1, wherein the positive electrode active material comprises: $LiFePO_4$, $LiCoO_2$ or $LiMn_2O_4$.

6. The method of claim 1, wherein the negative electrode active material comprises: a carbon-based, silicon-based, metal-based or oxide-based negative electrode active material.

7. The method of claim 1, further comprising: controlling second pore sizes after the heat-treating.

8. The method of claim 1, wherein the heat-treating comprises: heat-treating at a temperature of 50° C. to 100° C. for 5 to 60 minutes, pressing to have a predetermined thickness, and heat-treating at 100° C. to 150° C. to thereby control pore sizes of the second pores and the third pores.

* * * * *